(12) United States Patent
Blaha

(10) Patent No.: US 9,462,758 B2
(45) Date of Patent: Oct. 11, 2016

(54) DEVICE FOR PROTECTING THE CONTENTS OF PLANT CONTAINERS

(71) Applicant: John Blaha, Chicago, IL (US)

(72) Inventor: John Blaha, Chicago, IL (US)

( * ) Notice: Subject to any disclaimer, the term of this patent is extended or adjusted under 35 U.S.C. 154(b) by 84 days.

(21) Appl. No.: 13/914,185

(22) Filed: Jun. 10, 2013

(65) Prior Publication Data

US 2014/0053461 A1 Feb. 27, 2014

Related U.S. Application Data

(60) Provisional application No. 61/657,085, filed on Jun. 8, 2012.

(51) Int. Cl.
*A01G 13/02* (2006.01)
*A01G 13/00* (2006.01)
*A01G 9/02* (2006.01)

(52) U.S. Cl.
CPC .............. *A01G 13/00* (2013.01); *A01G 9/02* (2013.01); *A01G 13/0281* (2013.01)

(58) Field of Classification Search
CPC ............ A01G 13/02; A01G 13/0212; A01G 13/0237; A01G 13/0243; A47G 7/07; A47G 7/08
USPC ............ 47/20.1, 25.1, 29.3, 29.5, 29.7, 30, 47/31.3, 32.4, 41.01, 41.11, 41.12, 41.13
IPC ............. A01G 13/00, 13/02; A47G 7/08, 7/00, A47G 7/02
See application file for complete search history.

(56) References Cited

U.S. PATENT DOCUMENTS

| | | | |
|---|---|---|---|
| 2,440,569 A | 4/1948 | Baldwin | |
| 3,147,569 A * | 9/1964 | Murguia | A01G 9/10 47/73 |
| 3,571,972 A * | 3/1971 | Carter, Jr. | 47/32.4 |
| 4,369,598 A * | 1/1983 | Beckwith | 47/61 |
| 4,712,329 A * | 12/1987 | Anderson et al. | 47/84 |
| 4,977,703 A * | 12/1990 | Blanc | 47/84 |
| 4,995,192 A | 2/1991 | DeWid | |
| 5,184,421 A * | 2/1993 | Meharg | 47/65.5 |
| D337,077 S | 7/1993 | Turley | |
| 5,425,204 A | 6/1995 | Holmes et al. | |
| 5,605,009 A * | 2/1997 | Elder | A01G 13/0281 47/32 |
| 6,061,953 A | 5/2000 | Chubb et al. | |
| 7,080,479 B2 | 7/2006 | Dallimore et al. | |
| 7,568,308 B2 * | 8/2009 | Stearns | A01G 13/0281 47/20.1 |
| 7,617,631 B2 * | 11/2009 | Conrad et al. | 47/31.1 |

* cited by examiner

*Primary Examiner* — Lisa Tsang
(74) *Attorney, Agent, or Firm* — Brooks Kushman P.C.

(57) ABSTRACT

A device for protecting the contents of plant containers comprising a top portion, a cut-out with a semi-circular interior portion, and a channel portion. The interior portion and channel portion are shaped to provide clearance and receive the base or stem of a plant. Embodiments of the device may include grooves and apertures to provide flexibility and drainage and the device also includes the capability to accommodate different styles and sizes of containers along with various plants and shrubs.

15 Claims, 5 Drawing Sheets

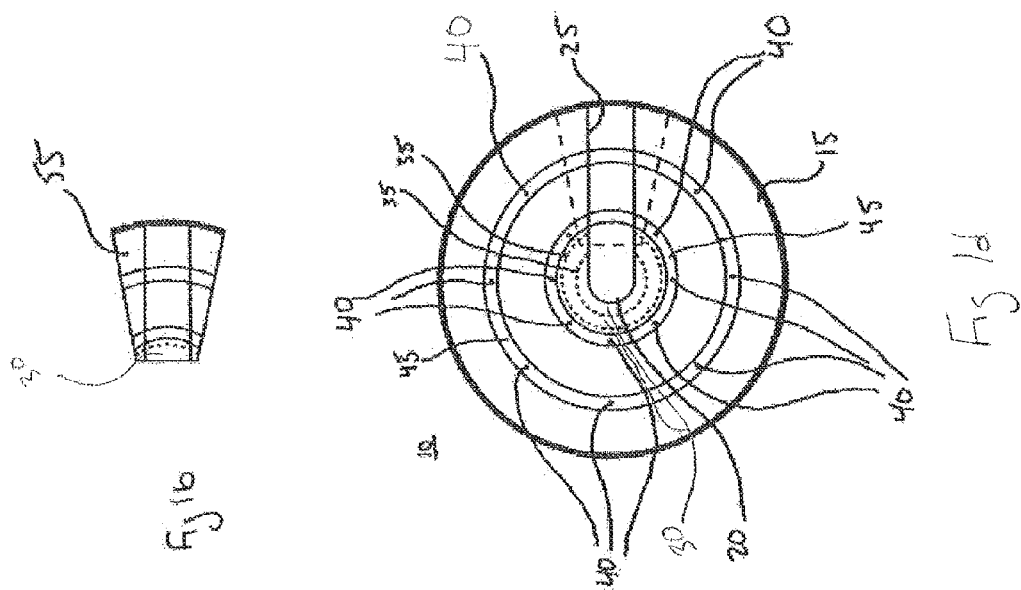
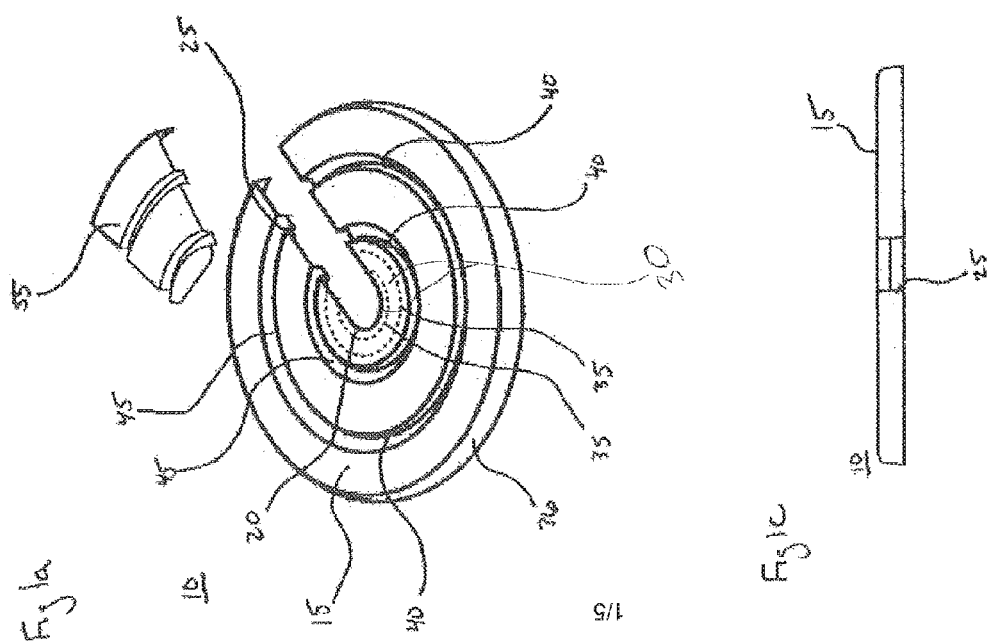

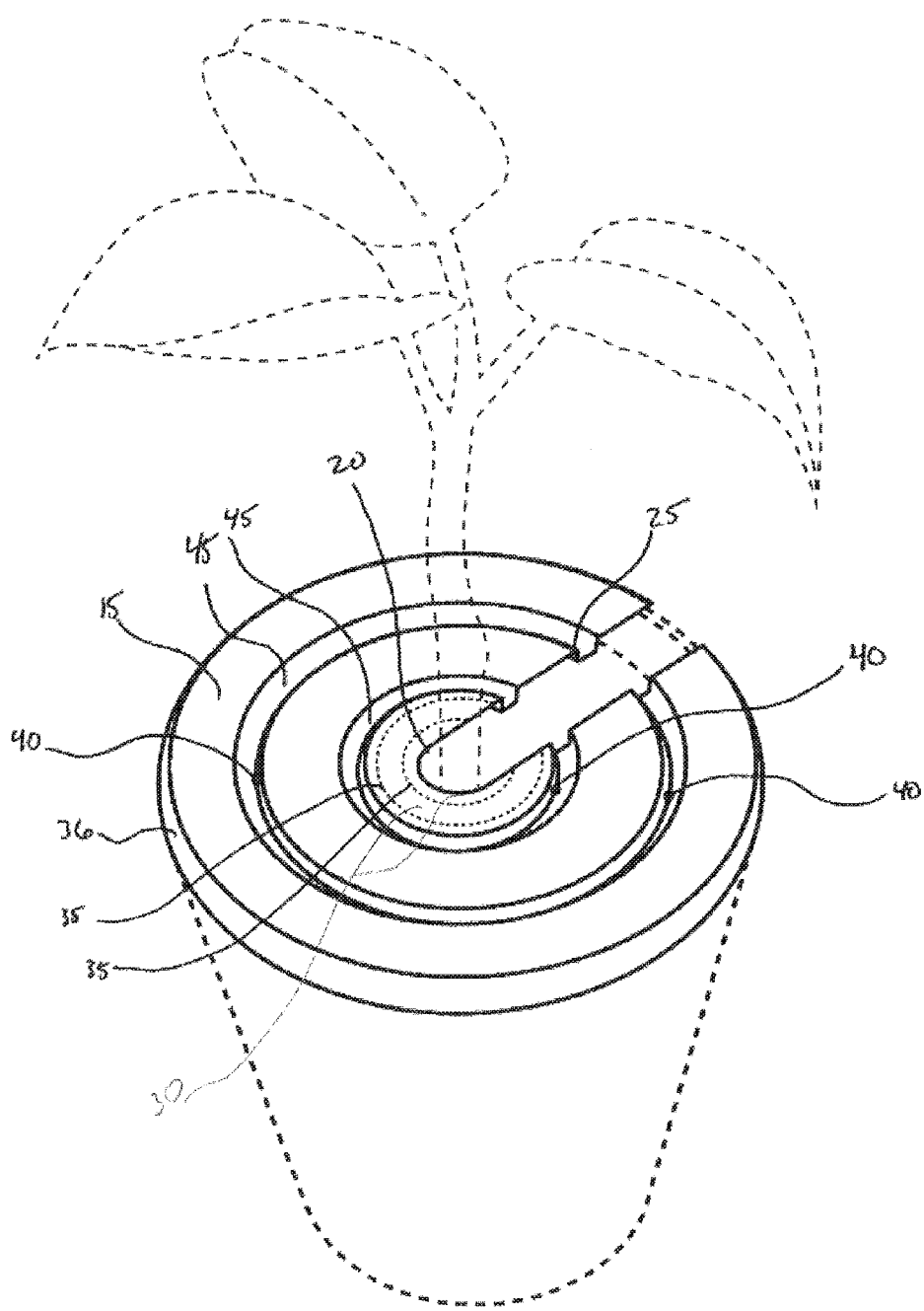

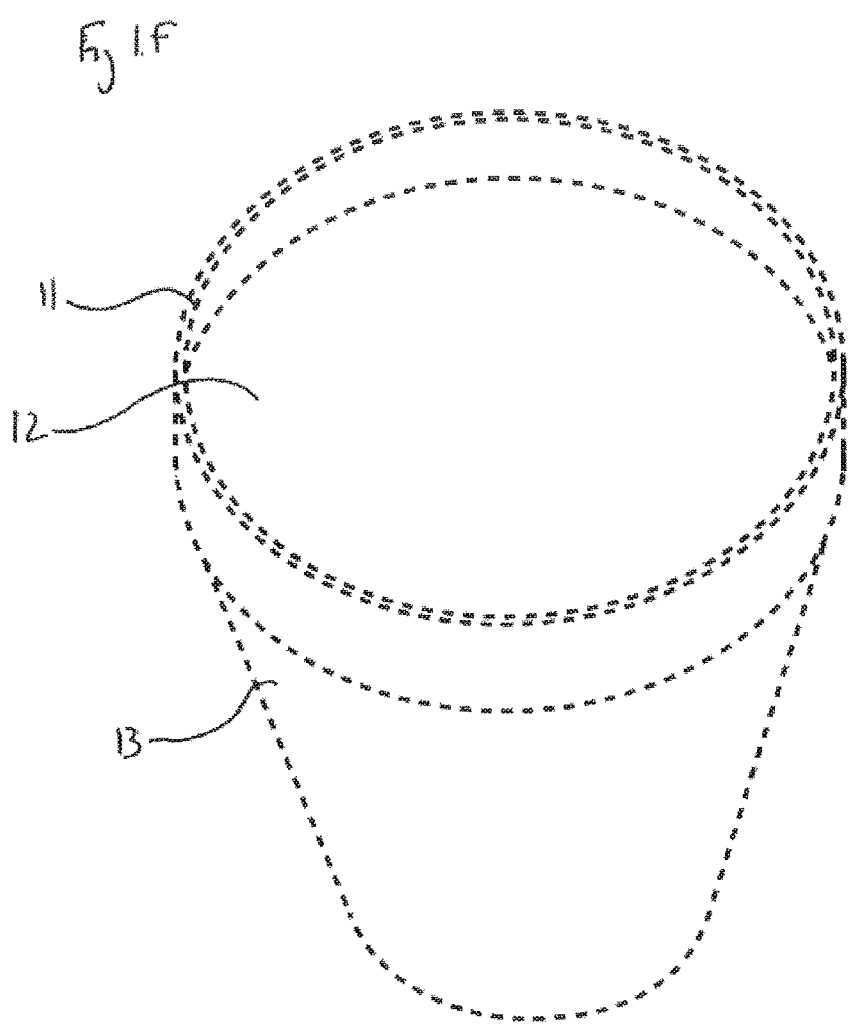

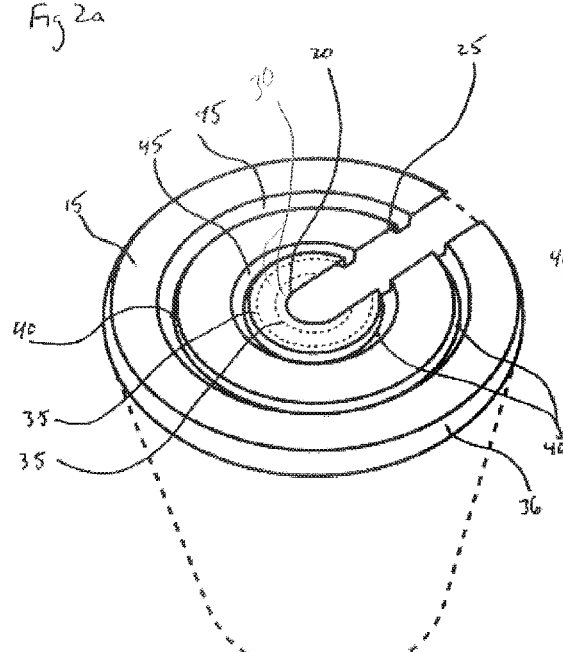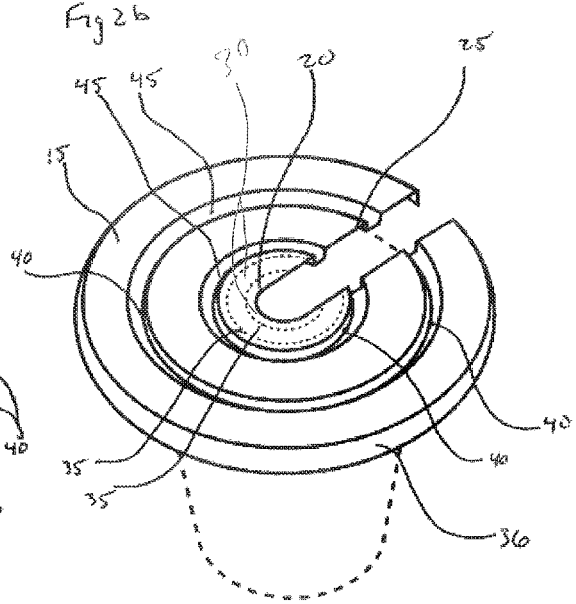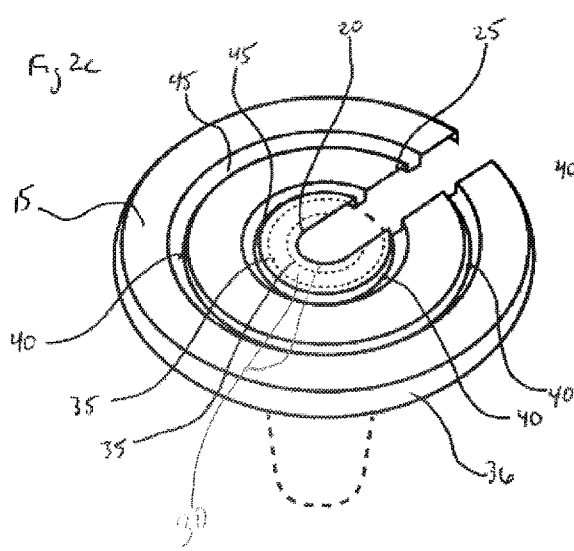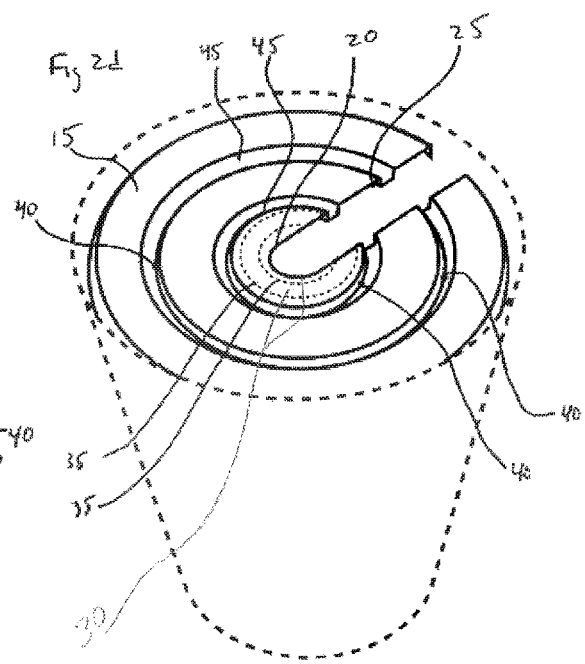

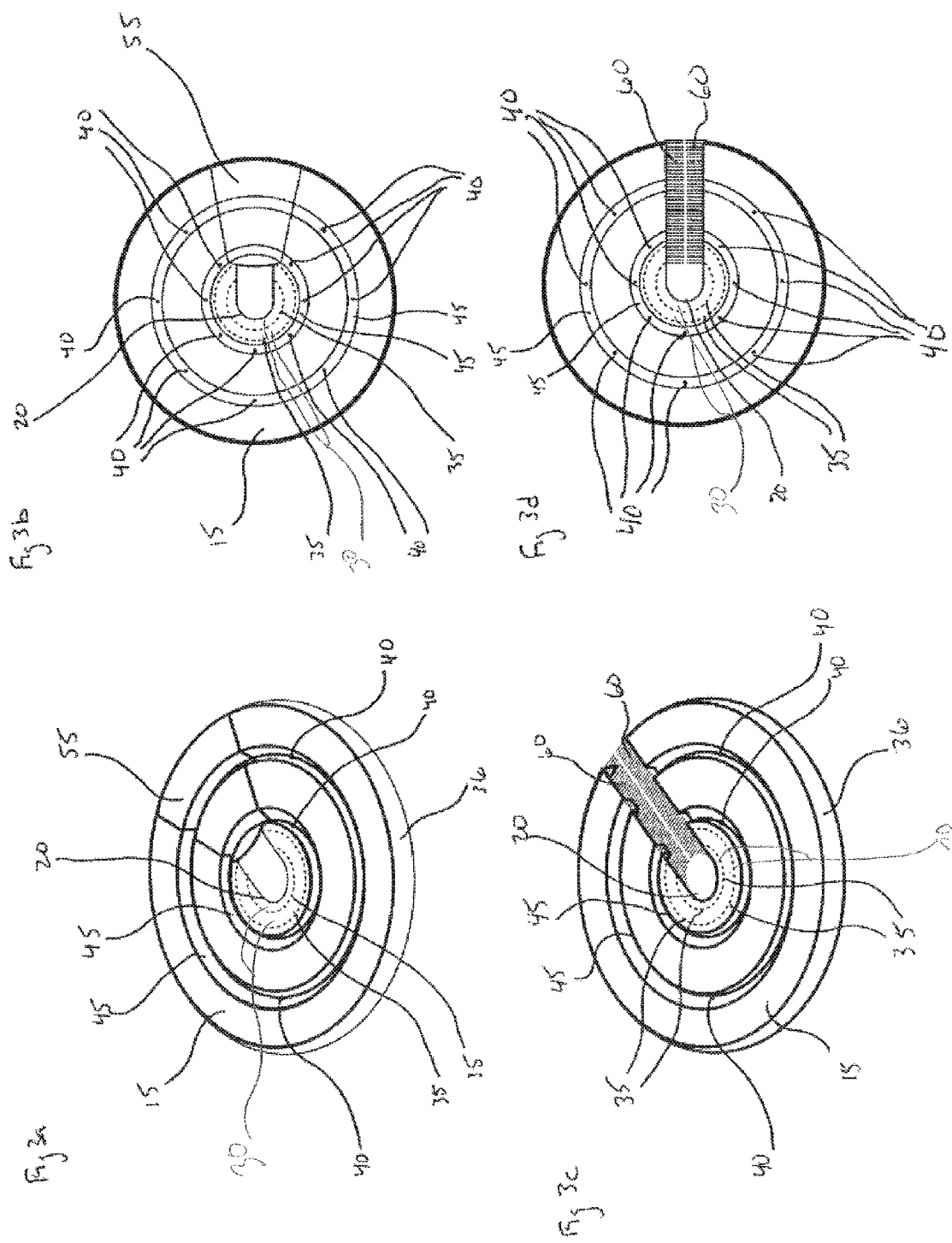

DEVICE FOR PROTECTING THE CONTENTS OF PLANT CONTAINERS

CROSS-REFERENCE TO RELATED APPLICATIONS

This application claims the benefit of U.S. provisional Application No. 61/657,085 filed Jun. 6, 2012, the disclosure of which is incorporated in its entirety by reference herein.

FIELD OF THE INVENTION

The present invention relates to a device for protecting the contents of plant containers such as plant pots, and in particular to a removeable content protector which prevents and/or discourages animals and/or weather elements from damaging the base of plants and the soil supporting the plants positioned within the containers. Embodiments of the device also accommodate different styles and sizes of containers along with various plants and shrubs.

BACKGROUND

Flower pots and similar containers are used to hold soil and plants both indoors and outdoors. The pots have a variety of sizes and are used with a variety of plants, flowers and shrubs. Soil and plants within the pots, however, may be exposed to weather elements, people and animals.

SUMMARY

A plant protector for pots includes a top portion configured to rest atop a pot containing a plant. The top portion includes an outer rim, one or more grooves on a surface thereof, and an edge defining a channel portion running from an outer edge of the top portion to an interior point. The channel includes a gap sufficient for clearance for a main stalk of a plant. The one or more grooves may be circular and positioned at intervals corresponding to varying pot sizes, such that a circumference of an edge of one of the one or more grooves matches a circumference of a pot rim. The match between the edge of one of the one or more grooves and circumference of a pot rim may facilitate a removeable attachment between a surface of the groove corresponding to the edge and the pot rim. The one or more grooves may be concentric. The plant protector may include one or more interior breakaway rings concentric with the rim of the top portion and may be removable to provide increased clearance for the main stalk. The one or more grooves may include one or more apertures for allowing water within the grooves to drain into the pot. The plant protector may include a cap including one or more cap grooves configured to removeably attach to the one or more grooves of the top portion.

A content protector for pots including a circular top portion configured to rest atop a pot containing a plant. The top portion includes an outer rim, one or more grooves provided on a surface thereof, and an edge defining a channel portion running from an outer edge of the top portion to an interior point. The channel includes a gap sufficient for clearance for a main stalk of a plant. The one or more grooves include one or more apertures to facilitate drainage from the top portion to into the pot. The one or more grooves may be circular and concentric with the rim of the top portion. The one or more grooves may extend below a plane of the top portion. The one or more grooves may be circular and positioned and positioned at intervals corresponding to varying pot sizes, such that a circumference of an edge of one of the one or more grooves matches a circumference of a pot rim to facilitate a removeable attachment between a surface of the groove corresponding to the edge and the pot rim. The content protector may include one or more sets of bristles secured along the edge defining the channel portion and gap. The content protector may include one or more interior breakaway rings concentric with the rim of the top portion and removable to provide increased clearance for the main stalk. The content protector may include a cap having one or more cap grooves configured to removeably attach to the one or more grooves of the top portion.

An apparatus for protecting a base of a plant includes a container having a container rim, an inner wall and an outer wall, and the base of the plant positioned within the inner wall in a growth medium containable within the container. The apparatus further includes a circular top portion configured to rest atop a pot containing a plant, the top portion including an outer rim and an edge defining a channel portion running from an outer edge of the top portion to an interior point. The channel includes a gap sufficient for clearance for a main stalk of a plant. A surface of the top portion includes one or more grooves having one or more apertures to facilitate drainage from the top portion into the pot. The apparatus may utilize one or more grooves to provide rigidity. One or more sets of bristles may be secured along the edge defining the channel portion and gap. The one or more grooves may be circular and positioned at intervals corresponding to varying pot sizes, such that a circumference of an edge of one of the one or more grooves may match a circumference of a pot rim to facilitate a removeable attachment between a surface of the groove corresponding to the edge and the pot rim. One or more breakaway rings may be concentric with the top portion rim and removable to provide increased clearance for the main stalk. The one or more grooves may be circular and concentric with the top portion rim. A cap may be included with one or more cap grooves configured to removeably attach to the top portion at the one or more grooves. The one or more grooves may extend below a plane of the top portion.

BRIEF DESCRIPTION OF THE DRAWINGS

A fuller understanding of the foregoing may be had by reference to the accompanying drawings, wherein:

FIG. 1a is a perspective view of a content protector in accordance with an embodiment of the present invention;

FIG. 1b is a top view of a portion of the content protector of FIG. 1a;

FIG. 1c is a front view of the content protector of FIG. 1a;

FIG. 1d is a top view of a portion of the content protector of FIG. 1a;

FIG. 1e is a perspective view of an example of the content protector of FIG. 1a shown positioned on a container with a plant;

FIG. 1f is a perspective view of the container of FIG. 1e;

FIG. 2a is a perspective view of the content protector of FIG. 1a with a first sized container;

FIG. 2b is a perspective view of the content protector of FIG. 1a with a second sized container;

FIG. 2c is a perspective view of the content protector of FIG. 1a with third sized container;

FIG. 2d is a perspective view of the content protector of FIG. 1a with a fourth sized container;

FIG. 3a is a perspective view of the content protector of FIG. 1a showing a removable cap positioned on the device;

FIG. 3b is a top view of the content protector of FIG. 3a;

FIG. 3c is a perspective view of the content protector of FIG. 1a in which two sets of bristles are attached to a channel portion of the content protector; and FIG. 3d is a top view of the content protector of FIG. 3c.

DESCRIPTION OF THE EMBODIMENTS

While the invention is susceptible to embodiments in many different forms, there are shown in the drawings and will be described herein, in detail, the preferred embodiments of the present invention. It should be understood, however, that the present disclosure is to be considered an exemplification of the principles of the invention and is not intended to limit the spirit or scope of the invention or the embodiments illustrated.

Referring now to FIGS. 1a through 1f, there is illustrated a content protector 10 in accordance with one embodiment of the present invention. The content protector 10 includes a means to removeably attach to containers, such as pots used to hold soil and plants. The content protector 10 also includes a means to accommodate varying container sizes further described herein. While the content protector 10 is shown herein with a circular shape, it should be understood that various shapes may be used without diverting from the spirit and scope of the present invention. For example, for a square shaped container, the content protector 10 may be shaped to correspond with a square rim of the square shaped container. When positioned on or within a container that includes a plant or shrub, the content protector 10 protects the contents of the container including the base of the plant and the soil included therein from exposure to damaging elements such as wild animals, domesticated animals, and weather elements. For example, the content protector 10 prevents animals from digging into the soil or going to the bathroom in the container. FIG. 1f illustrates an example of a container for reference without a plant and the content protector 10. The container includes a rim 11 an inner wall 12 and an outer wall 13.

Continuing to refer to FIGS. 1a through 1d, the content protector 10 includes a top portion 15 and a cut-out with a semi-circular interior portion 20 and a channel portion 25. The interior portion 20 and channel portion 25 are shaped to provide clearance and receive the base or stem of a plant. Additionally, the top portion 15 may include a plurality of rings 30 that break away at perforated edges 35 to expand available clearance for plants with larger diameter stems or trunks. The number of rings 30 and inclusion thereof may vary as desired. The means to removeably attach to a container includes an outer rim 36 and grooves of the content protector 10 to sit on the rim of a container or sit within a container when the container's profile is tapered such that the container's base is smaller than the rim. If desired, the outer rim 36 may be of a malleable material, such as rubber to provide flexibility for the outer rim 36 and additional accommodation for varying container sizes.

A plurality of apertures 40 are positioned in two circular grooves 45 in the top portion 15. The number of apertures 40 and the inclusion thereof may vary as desired. While varying materials such as different types of wood may be used to form the content protector 10, the apertures 40 and grooves 45 provide additional rigidity and durability as certain materials may expand, warp or experience other material property changes due to weather elements such as sun light and heat. For example, for materials that expand or warp with extended exposure to sun light such as plastic, the apertures 40 and grooves 45 provide flexibility for the content protector 10 to accommodate material expansion that may otherwise crack or warp the content protector 10. The apertures 40 and grooves 45 also allow water to drain into the container if exposed to rain or if a user spills water onto the content protector 10 while watering the plant. In this embodiment two grooves 45 are shown, however it is within the scope of the invention to have a varying number of grooves 45 as desired. The grooves 45 may be positioned at varying distances relative to the outer rim 36 of the content protector 10. The positioning of the grooves 45 further facilitate the means to accommodate varying sizes of pots and/or containers as the grooves 45 extend below the plane of the top portion 15 such that the grooves 45 may sit on an inner wall or outer wall of a container comparably sized to the grooves 45. As such, each groove 45 provides the content protector 10 with accommodation for two additional container sizes. FIGS. 2a through 2d show examples of multiple container sizes that may be utilized with the content protector 10.

Now additionally referring to FIGS. 3a through 3d, the content protector 10 may include a means to provide additional protection for the contents of the container by optionally including elements to cover the channel portion 25. Two examples to provide additional protection are a removable cap 55 and two sets of bristles 60. The removeable cap 55 is shaped to snap into the grooves 45 included on the top portion 15 after the content protector 10 is positioned around a plant and on a container. Dashed lines 56 indicate the cap 55 position location in FIG. 1b. The two sets of bristles 60 permit a stem or trunk of a plant to pass between the bristles 60 when positioning the content protector 10 around a plant without leaving the channel portion 25 open.

From the foregoing and as mentioned above, it will be observed that numerous variations and modifications may be effected without departing from the spirit and scope of the novel concept of the invention. It is to be understood that no limitation with respect to the specific methods and apparatus illustrated herein is intended or inferred.

What is claimed is:

1. A plant protector for pots comprising:
   a top portion configured to rest atop a pot containing a plant, wherein the top portion includes an outer rim, one or more grooves extending below a plane defined by a surface of the top portion and having a lower groove surface below and parallel with the surface of the top portion, the lower groove surface having one or more apertures to allow water to pass from the one or more grooves to the pot, and an edge defining a channel portion running from an outer edge of the top portion to an interior portion; and
   a cap including one or more cap grooves sized for insertion within the one or more grooves of the top portion,
   wherein the insertion occurs on two opposed sides of the cap, and
   wherein the channel portion defines a gap sufficient for clearance for a main stalk of the plant.

2. The plant protector of claim 1, wherein the one or more grooves are circular and positioned at intervals corresponding to varying pot sizes, such that a circumference of an edge of one of the one or more grooves matches a circumference of a pot rim to facilitate a removable attachment between a surface of the groove corresponding to the edge and the pot rim.

3. The plant protector of claim 1, wherein the one or more grooves are concentric.

4. The plant protector of claim 1, further comprising one or more interior breakaway rings concentric with the rim of the top portion and removable to provide increased clearance for the main stalk.

5. A content protector for pots comprising:
- a circular top portion configured to rest atop a pot containing a plant, wherein the circular top portion includes an outer rim, an edge defining a channel portion running from an outer edge of the top portion to an interior point, wherein the channel portion includes a gap sufficient for clearance for a main stalk of the plant, and wherein one or more grooves extend below a plane of a surface of the circular top portion and have a lower groove surface below and parallel with the surface of the circular top portion and include one or more apertures to facilitate drainage from the top portion in to the pot; and
- a cap including one or more cap grooves sized for insertion within the one or more grooves of the circular top portion, wherein the one or more grooves of the circular top portion are adjacent to two opposed sides of the cap.

6. The content protector of claim 5, wherein the one or more grooves are circular and concentric with the rim of the top portion.

7. The content protector of claim 5, wherein the one or more grooves are circular and positioned at intervals corresponding to varying pot sizes, such that a circumference of an edge of one of the one or more grooves matches a circumference of a pot rim to facilitate a removable attachment between a surface of one of the one or more grooves corresponding to the edge and the pot rim.

8. The content protector of claim 5, further comprising one or more sets of bristles secured along the edge defining the channel portion and gap.

9. The content protector of claim 5, further comprising one or more interior breakaway rings concentric with the rim of the top portion and removable to provide increased clearance for the main stalk.

10. An apparatus for protecting a base of a plant comprising:
- a container having a container rim, an inner wall and an outer wall, wherein the base of the plant is positioned within the inner wall in a growth medium containable within the container;
- a circular top portion configured to rest atop the container, wherein the top portion includes an outer rim, an edge defining a channel portion running from an outer edge of the top portion to an interior point, wherein the channel portion includes a gap sufficient for clearance for a main stalk of the plant, and one or more grooves extending below a plane defined by a surface of the top portion and having a lower groove surface below and parallel with the surface of the top portion, the lower groove surface having one or more apertures to facilitate drainage from the top portion into the container; and
- a cap including one or more cap grooves sized for insertion within the one or more grooves of the circular top portion, wherein the insertion occurs on two opposed sides of the cap.

11. The apparatus of claim 10, wherein the one or more grooves are spaced apart from one another to provide additional structural rigidity of the container when the circular top portion rests atop the container.

12. The apparatus of claim 10, further comprising one or more sets of bristles secured along the edge defining the channel portion and gap.

13. The apparatus of claim 10, wherein the one or more grooves are circular and positioned at intervals corresponding to varying container sizes, such that a circumference of an edge of one of the one or more grooves matches a circumference of a container rim to facilitate a removable attachment between a surface of the one of the one or more grooves corresponding to the edge and the container rim.

14. The apparatus of claim 10, further comprising one or more breakaway rings concentric with the rim of the top portion and removable to provide increased clearance for the main stalk.

15. The apparatus of claim 10, wherein the one or more grooves are circular and concentric with the outer rim of the top portion.

* * * * *